United States Patent
Siraky

[11] Patent Number: 6,127,795
[45] Date of Patent: Oct. 3, 2000

[54] TRANSMITTING PROCESS INFORMATION FOR REGULATING DRIVES

[75] Inventor: Josef Siraky, Donaueschingen, Germany

[73] Assignee: Max Stegmann GmbH, Donaueschingen, Germany

[21] Appl. No.: 09/144,048

[22] Filed: Aug. 31, 1998

[30] Foreign Application Priority Data

Sep. 27, 1997 [DE] Germany .................. 197 42 801

[51] Int. Cl.⁷ .................................. G05B 5/01
[52] U.S. Cl. .................. 318/615; 318/562; 318/661
[58] Field of Search .................. 318/615, 661, 318/562

[56] References Cited

U.S. PATENT DOCUMENTS

| | | | |
|---|---|---|---|
| 4,139,811 | 2/1979 | Klinger | 318/615 |
| 4,808,895 | 2/1989 | Fujita et al. | 318/384 |
| 5,250,880 | 10/1993 | Chesney et al. | 318/135 |
| 5,446,355 | 8/1995 | Janosky et al. | 318/661 |
| 5,686,804 | 11/1997 | Siraky | 318/640 |
| 5,744,706 | 4/1998 | Siraky | 73/116 |

FOREIGN PATENT DOCUMENTS

| | | |
|---|---|---|
| 0 575 843 B1 | 5/1996 | European Pat. Off. . |
| 2 188 818 | 10/1987 | United Kingdom . |

OTHER PUBLICATIONS

Dürr, A., "Mehrfachnutzung von Leitungen", Der Elektromeister and Deutsches Elektrohandwerk, 1971, vol. 2, pp. 75–76.

Primary Examiner—Paul Ip
Assistant Examiner—Rina I. Duda
Attorney, Agent, or Firm—Hutchins, Wheeler & Dittmar

[57] ABSTRACT

For regulating drives, process information is transmitted from a measuring device to a regulating device. In addition to position-measurement signals, acceleration-measurement signals are also transmitted. The acceleration-measurement signals are used as reference signals for position-measurement signals. As a result, no additional connecting leads are required for the additional transmission of acceleration-measurement signals.

7 Claims, 2 Drawing Sheets

TRANSMITTING PROCESS INFORMATION FOR REGULATING DRIVES

BACKGROUND OF THE INVENTION

1. Field of the Invention

This application relates to the field of regulating drives and more particularly to the field of transferring process information for regulated drives.

2. Description of Related Art

To regulate drives, it is known to detect the rotational speed (the speed of the drive) by means of a tacho-generator and to control the rotational speed (the speed of the drive) depending on a deviation from a set value. In order to improve the regulation, the speed information is differentiated as a function of time in order to determine the acceleration. In addition, the position of the drive may also be generally determined.

A system for measuring the angle of rotation is known from DE 42 20 502 C1 in which the angle of rotation is measured incrementally and sinusoidal/cosinusoidal position measurement signals are transmitted. Rotational speed information can be obtained from these signals by differentiating the position of the angle of rotation as a function of time. Acceleration information can be obtained by further differentiation as a function of time. This double differentiation, however, does not result in information that is adequate in all cases.

It is therefore advantageous for directly measured acceleration information to be available in addition to position information. The transmission of an additional acceleration measurement signal, however, requires an additional transmission channel and additional transmission lines. These increase cost and the likelihood of problems.

Thus, it would be advantageous to provide a method and a device in which additional process information can be transmitted for regulation without increasing the number of lines required for the transmission.

SUMMARY OF THE INVENTION

In known methods and devices for transmitting process information for regulated drives, incremental position measurement signals are transmitted either as digital or as analog, especially as sinusoidal/cosinusoidal signals, from the measuring device to the regulating device. In order to transmit these signals from the measuring device to the regulating device, at least two leads are required in each case, with one lead serving to transmit the position measurement signals and the other lead serving to transmit a reference signal. Conventionally, the reference signal is a constant potential that serves as a reference potential for the position measurement signals. The present invention includes using an additional process measurement signal, such as the acceleration signal, as the reference signal. Thus, the position-measurement signal is not based on a constant reference potential but on the changing voltage of the additional process measurement signal as a reference potential. This creates the possibility for transmitting an additional process measurement signal from the measuring device to the regulating device without additional transmission leads being required.

In rotary drives, a sinusoidal/cosinusoidal position measurement signal is preferably used, with two leads being used for transmitting the sinusoidal signal and two leads for transmitting the cosinusoidal signal. In order to achieve a high regulating consistency, rotary acceleration is transmitted as additional process information. The positive or negative acceleration measurement signal is used as the reference signal for the sinusoidal position measurement signal, and has an opposite sense when used as a reference signal for the cosinusoidal position measurement signal. The rotary acceleration information can be obtained in the regulating device through a differential amplifier. The invention will now be described in greater detail with reference to an embodiment shown in the drawing.

DETAILED DESCRIPTION OF THE PREFERRED EMBODIMENT(S)

Figure 1:
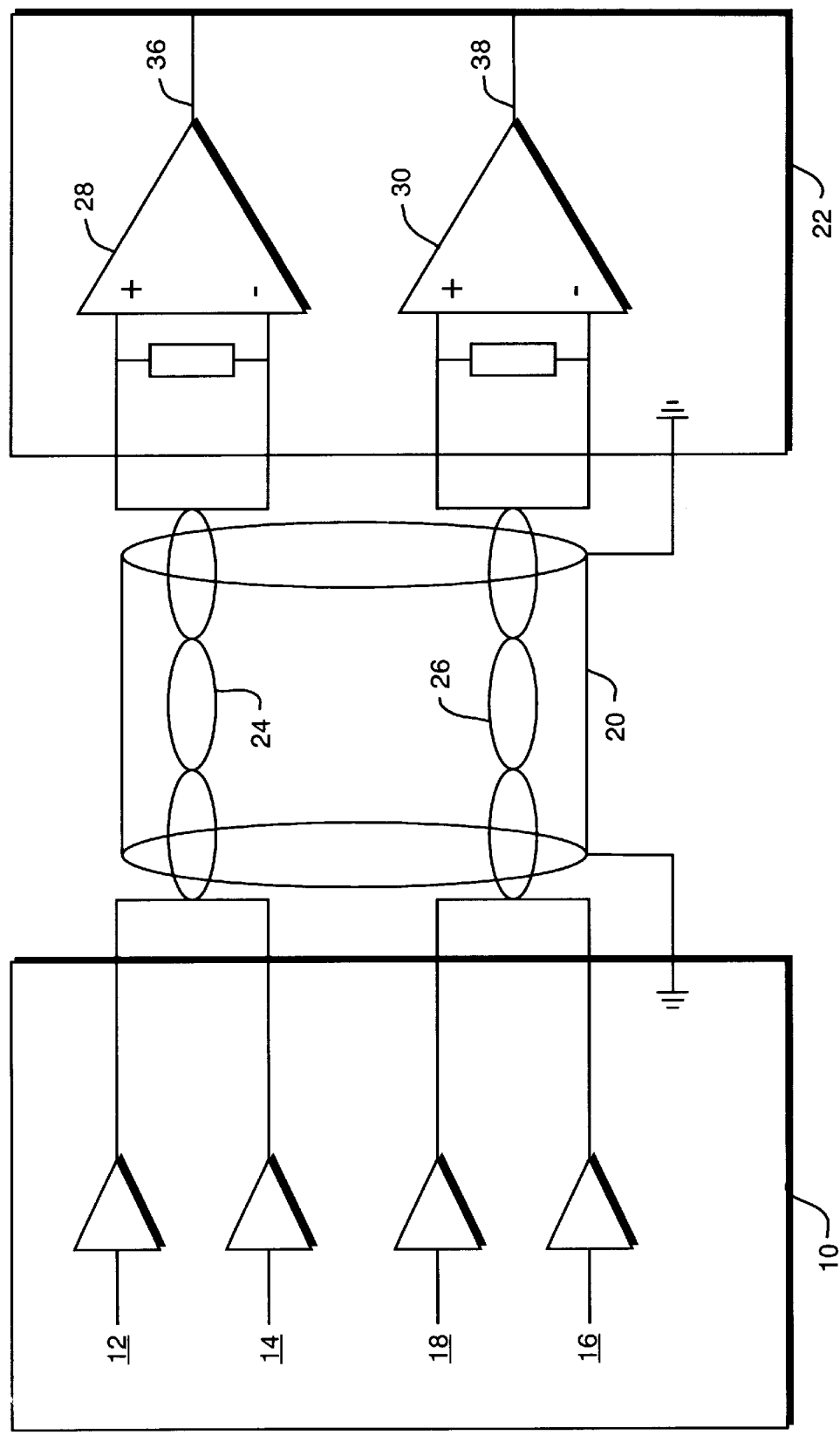
FIG. 1 is a schematic view of a device according to the prior art.

FIG. 1 shows a device for transmitting process information for regulating drives as is known for example from DE 42 20 502 C1.

A measuring device 10 has a conventional sensor (not shown) for sensing the angle of rotation that generates a sinusoidal and a cosinusoidal incremental position measurement signal. The sinusoidal signal is applied to a terminal 12 as a voltage signal relative to a reference potential applied to a terminal 14. The cosinusoidal signal is applied to a terminal 16 as a voltage signal that is relative to a constant reference potential at a terminal 18.

A connecting cable 20 links the measuring device 10 with an input stage of a regulating device 22. The connecting cable 20 has two pairs of leads 24, 26. The pair of leads 24 connects the terminal 12 and the terminal 14 with a differential amplifier 28 of the regulating device 22 while the pair of leads 26 connects the terminal 16 and the terminal 18 with a differential amplifier 30 of the regulating device 22. The differential amplifier 28 supplies an output 36 thereof with the sinusoidal position measurement signal for regulating the rotary drive, while the differential amplifier 30 supplies an output 38 thereof with the cosinusoidal position-measurement signal for regulation.

Figure 2:
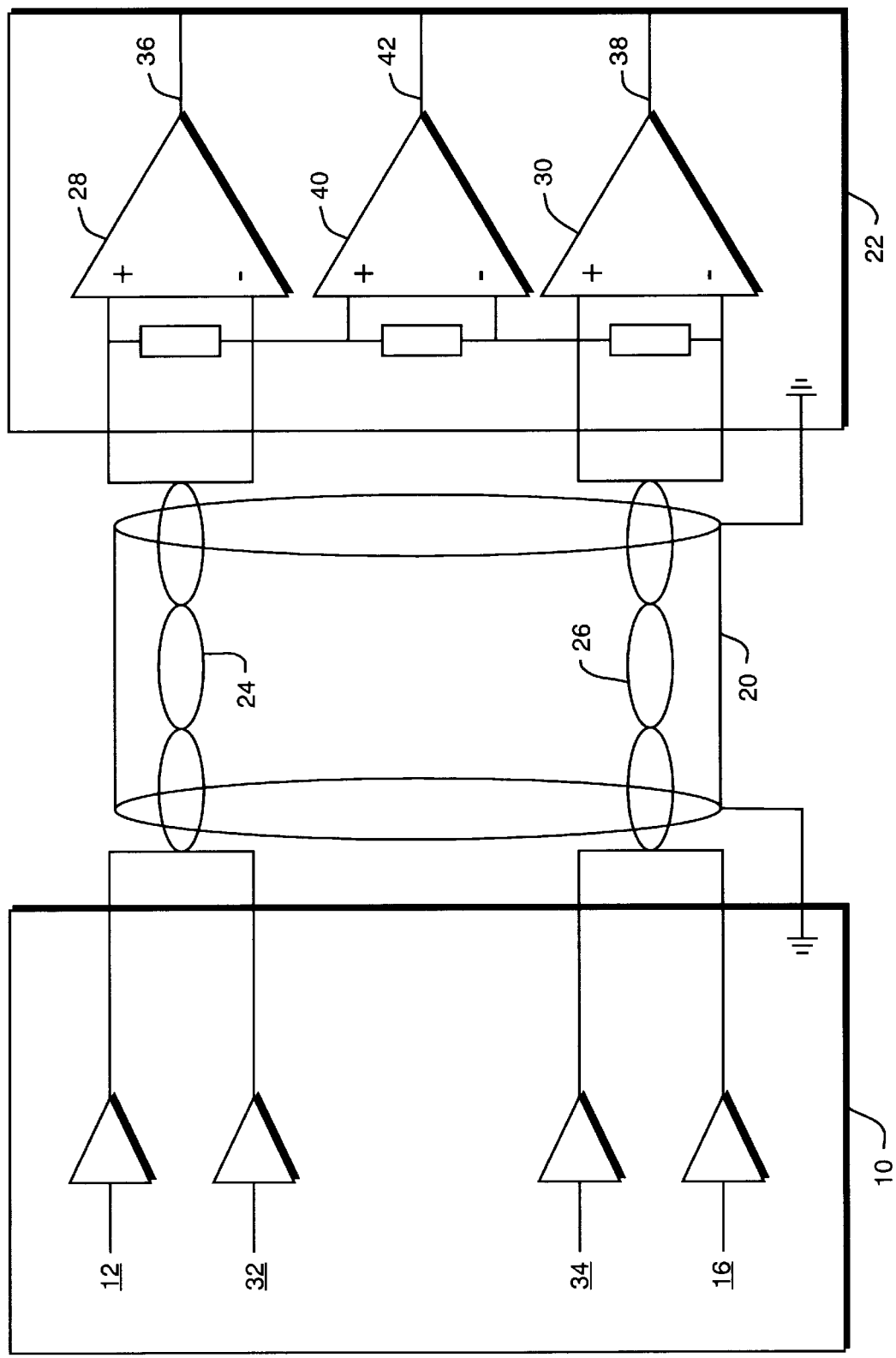
FIG. 2 is a schematic view of a device according to the invention.

In FIG. 2, the device according to the invention is shown in a representation that corresponds to FIG. 1 where like reference numbers represent analogous components.

According to the invention, the measuring device 10, in addition to the sensor for the angle of rotation that supplies the sinusoidal and cosinusoidal position-measurement signals, has a rotary acceleration sensor (not shown) as well that supplies a rotary acceleration measurement signal. Such rotary acceleration sensors are conventionally known in the art and can operate, for example, according to the Ferraris principle.

The sinusoidal position measurement signal is applied to the terminal 12 as a voltage signal. The voltage of the sinusoidal signal is based on the positive rotary acceleration signal that is applied to a terminal 32 as reference signal. This may be contrasted with the prior art where a constant reference potential is applied to the terminal instead of the positive rotary acceleration signal. The cosinusoidal position measurement signal is applied to the terminal 16 and is based on the negative rotary acceleration signal that is applied to a terminal 34 instead of a constant reference potential, as in the prior art.

The connecting cable 20 connects the measuring device 10 with the two pairs of leads 24, 26 in a fashion similar to that according to the prior art shown in FIG. 1. The interface configuration of the prior art according to FIG. 1 can therefore be used in connection with the present invention.

In the input stage of the regulating device 22, the sinusoidal position measurement signal is provided at the output 36 of the differential amplifier 28 and the cosinusoidal position measurement signal is provided at the output 38 of the differential amplifier 30. Since the sinusoidal signal at the output 36 and the cosinusoidal signal at the output 38 are formed by subtraction of the voltages at terminals 12, 32 and the terminals 16, 34, respectively, the rotary acceleration signal present at the terminals 32, 34 has no effect on the sinusoidal position measurement signal at the output 36 or the cosinusoidal position-measuring signal at the output 38. Note that differentiating either or both of the sinusoidal and cosinusoidal signals by subtraction would cause any components of the rotary acceleration value contained therein to cancel. Note also that when components of the rotary acceleration value remain in the sinusoidal and cosinusoidal measurement signals, those components may be canceled by combining the sinusoidal and cosinusoidal measurement signals.

The terminals of the regulating device 22 that are connected via the connecting cable 20 with the terminal 32 and the terminal 34 of the measuring device 10 are also connected to another differential amplifier 40 which provides a rotary acceleration measurement signal at an output 42 thereof for drive regulation from the positive rotary acceleration measurement signal at the terminal 32 and the negative rotary acceleration measurement signal at the terminal 34.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A device for transmitting process information for regulated drives, comprising:
   a measuring device that received process information including at least one position measurement signal and a reference signal; and
   a regulating device coupled to said measuring device to receive the at least one position measurement signal and to receive the reference signal for the at least one position measurement signal, wherein the reference signal includes additional process information, the at least one position measurement signal varies according to angle of rotation and wherein the additional process information includes a rotary acceleration signal and includes a sinusoidal position measurement signal and a cosinusoidal position measurement signal, and the acceleration measurement signal is added to one of and subtracted from another one of the sinusoidal position measurement signal and the cosinusoidal position measurement signal, and wherein said regulating device has a differential amplifier that generates the acceleration measurement signal using reference signals.

2. A device for regulating drives, comprising:
   a regulating device;
   a first input, coupled to said regulating device, said first input receiving a first positional signal;
   a second input, coupled to said regulating device and receiving a reference signal for the first positional signal, wherein the first reference signal includes additional process information is an acceleration measurement signal, and is sinusoidal position measurement signal;
   a third input, coupled to said regulating device, said third input receiving a second positional signal; and
   a fourth input, coupled to said regulating device and receiving a second reference signal for the second positional signal, wherein the second reference signal includes additional process information.

3. A device, according to claim 2, wherein the second reference signal is an acceleration measurement signal.

4. A device, according to claim 2, wherein the second position measurement signal varies according to angle of rotation and wherein the additional process information includes a rotary acceleration signal.

5. A device, according to claim 3, wherein the second position measurement signal is a cosinusoidal position measurement signal.

6. A device, according to claim 5, wherein the acceleration measurement signal is added to one of and subtracted from another one of the sinusoidal position measurement signal and the cosinusoidal position measurement signal, and wherein said regulating device has a differential amplifier that generates the acceleration measurement signal using the first and second reference signals.

7. A device for transmitting process information for controlled drives, comprising:
   a measuring device that receives process information including at least one position-measurement signal and a reference signal; and
   a controlling device coupled to said measuring device to receive the at least one position-measurement signal and to receive the reference signal for the at least one position-measurement signal;
   wherein the reference signal includes additional process information, the reference signal is added to one of and subtracted from another one of the position measurement signal, and said controlling device has a differential amplifier that generates the additional process information using the reference signals.

* * * * *